2,892,867

2-(CARBOXYMETHOXY) PHENYLIMINODIACETIC ACIDS

Bill M. Williams and Luther F. Berhenke, Midland, Mich., assignors to The Dow Chemical Company, Midland, Mich., a corporation of Delaware No Drawing. Application April 8, 1958
Serial No. 727,033

5 Claims. (Cl. 260—519)

This invention is directed to the 2-(carboxymethoxy) phenyliminodiacetic acids corresponding to the formula

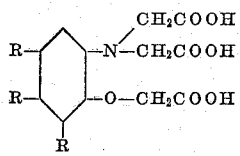

and their alkali metal salts. In this and succeeding formulas, one of the R symbols represents hydrogen and each of the remaining R symbols represents hydrogen, halogen, or lower alkyl. The term alkali metal is employed in the present specification and claims to include ammonium. The expression lower alkyl refers to an alkyl radical containing from 1 to 4 carbon atoms, inclusive.

The compounds of this invention are crystalline solids which are soluble in many organic solvents. The acid compounds are of low solubility in water, while their alkali metal salts are of substantially greater water solubility. The new compounds are useful as parasiticides and are adapted to be employed as toxic constituents of compositions for the control of many bacterial, fungal and insect pests. They are also valuable as chelating agents and herbicides.

The acids of the present invention may be prepared by causing monochloroacetic acid to react with an aminophenol corresponding to the formula

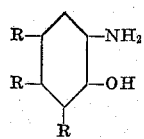

The reaction is carried out in the presence of an alkaline reagent such as an alkali metal hydroxide and under conditions whereby the reaction mixture is maintained at a pH greater than 9. The contacting of the aminophenol and monochloroacetic acid is effected in water as reaction medium and preferably under blanketing of an inert gas such as nitrogen. Under these conditions, the reaction takes place smoothly at the temperature range of from 90° C. to the boiling point of the reaction mixture with the production of the desired product and hydrogen chloride of reaction. This hydrogen chloride appears in the reaction mixture as alkali metal chloride. Conveniently the reaction may be carried out at the boiling temperature of the reaction mixture and under reflux. Good results are obtained when reacting one molecular proportion of aminophenol with at least three molecular proportions of monochloroacetic acid in the presence of 6 or more molecular proportions of alkaline reagent whereby the reaction mixture is brought and maintained under the desired pH conditions.

In carrying out the reaction, the aminophenol reactant and monochloroacetic acid are dispersed in water and the resulting mixture brought with stirring to a pH greater than 9 by the addition of alkaline reagent. Stirring is thereafter continued and the reaction mixture heated at a temperature of from 90° C. to the boiling point of the reaction mixture to complete the reaction. During the course of the reaction, the mixture is maintained at a pH greater than 9 and preferably at a pH of from 10 to 11 by the successive and portionwise addition of alkaline reagent. Upon completion of the reaction between the monochloroacetic acid and aminophenol reagent as evidenced by the substantial cessation of autogenous change of the pH of the reaction mixture, the reaction mixture is acidified with a mineral acid such as hydrochloric acid, and brought to its isoelectric point which is usually reached at a pH of about 3. Toward the completion of the acidification, the desired product may precipitate in the reaction mixture as a crystalline solid. Upon completion of the acidification, the reaction mixture may be cooled to precipitate the acid product or precipitate further product. The product may be separated by filtration or decantation and thereafter purified by convenient methods. In an alternative procedure, the acidified reaction mixture may be extracted with a solvent such as methyl isobutyl ketone and the solvent thereafter removed by evaporation to obtain the desired acid as a crystalline residue.

The new salts of the present invention may be prepared by reacting the acid with a stoichiometric amount of a basic compound of an alkali metal to introduce alkali metal atoms for the carboxyl hydrogen atoms in the acid compound. Suitable basic compounds include the hydroxides, carbonates, bicarbonates, and other similar compounds of alkali metals, such as ammonium hydroxide, sodium carbonate, potassium bicarbonate, and others. Thus, for example, one molecular proportion of the acid is reacted with one or two molecular proportions of alkali metal hydroxide to introduce alkali metal atoms for the hydrogen in one or both of the carboxyl groups attached through a methylene group to the imino nitrogen atom. Where it is desired to introduce three alkali metal groups in the molecule, one molecular proportion of the acid is reacted with, for example, 1.5 molecular proportions of an alkali metal carbonate, or three molecular proportions of an alkali metal hydroxide. The reaction is carried out in a liquid reaction medium and preferably in water, and goes forward smoothly at temperatures in the range of from 0° to 100° C.

In carrying out the reaction, the acid and basic compound are dispersed together in the reaction medium and maintained for a period of time in the contacting temperature range. Upon completion of the reaction, the reaction mixture may be concentrated by evaporation of reaction medium. During the concentration, the desired salt precipitates as a crystalline solid and may be separated by decantation or filtration and thereafter dried. The dried product may be further purified by conventional methods.

The following examples illustrate the present invention but are not to be considered as limiting.

Example 1.—2-(carboxymethoxy)phenyliminodiacetic acid

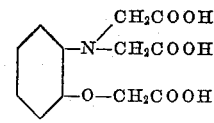

A mixture of o-aminophenol (10.9 grams; 0.1 gram-mole) and 37.8 grams (0.4 mole) of monochloroacetic acid in 50 milliliters of water was neutralized with aqueous 10 percent sodium hydroxide (0.4 mole NaOH) and further sodium hydroxide added to raise the pH to about 10. The resulting mixture was thereafter heated for one hour at the boiling temperature with stirring and under an atmosphere of nitrogen. During the period of heating, which was carried out under reflux, the reaction mixture was maintained at a pH of about 10 by the successive and portionwise addition of aqueous 10 percent sodium hydroxide. The initial and successive amounts of NaOH employed amounted to a total of 0.6 mole. Toward the end of the heating period, there was no substantial change in pH of the reaction mixture. The reaction mixture was then cooled to room temperature and acidified to its isoelectric point, at a pH of about 3, by the addition of hydrochloric acid. Following the acidification, the mixture was extracted with methyl isobutyl ketone and the solvent extract treated with activated charcoal. The solvent was then removed by evaporation to obtain a 2-(carboxymethoxy)phenyliminodiacetic acid product as a crystalline solid residue. This product was recrystallized from methyl isobutyl ketone, and found to melt at 150°–160° C. with decomposition. The product was titrated as a tricarboxylic acid with sodium hydroxide and found to have a neutral equivalent of 95 as compared to a theoretical equivalent of 94.4.

*Example 2.—2(carboxymethoxy)phenyliminodiacetic acid, disodium salt*

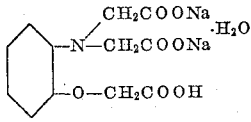

2-carboxymethoxy-phenylimino diacetic acid (6.38 grams; 0.02 mole) is dispersed in 50 milliliters of water and a 10 percent aqueous solution of 1.6 grams of sodium hydroxide (0.04 mole) added thereto with stirring. The solvent is then removed by evaporation to obtain a 2-(carboxymethoxy)phenyliminodiacetic acid, disodium salt monohydrate product as a white crystalline solid. This product is recrystallized from aqueous 50 percent ethanol and found to have carbon, nitrogen and sodium contents of 41.8, 4.05 and 13.3 percent as compared to theoretical contents of 41.3, 4.1 and 13.1, respectively. The product is infusible but decomposes at temperatures above 285° C.

In similar manner, a 2-(carboxymethoxy)phenyliminodiacetic acid, trisodium salt, is prepared by reacting one molecular proportion of 2-(carboxymethoxy)phenyliminodiacetic acid and three molecular proportions of sodium hydroxide.

*Example 3.—2-(carboxymethoxy)-5-chloro-phenyliminodiacetic acid*

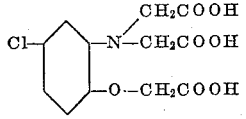

Monochloroacetic acid (141.7 grams; 1.52 moles) was added with stirring to 54.5 grams (0.38 mole) 2-amino-4-chlorophenol dispersed in 500 milliliters of water. Stirring was thereafter continued and 60.8 grams (1.52 moles) of solid sodium hydroxide added to the reaction mixture whereupon the temperature of the mixture rose to 73° C. The mixture was then placed under nitrogen blanketing and heated at the boiling temperature (106° C.) and under reflux with continuous stirring for 5.5 hours. During the heating period, the mixture was maintained at a pH of about 10 by the successive and portionwise addition of aqueous 30 percent sodium hydroxide. The initial and successive amounts of NaOH employed amounted to a total of 3.04 moles. Toward the end of the heating period, there was no substantial change in the pH of the reaction mixture. The reaction mixture was then acidified to its isoelectric point at a pH of about 3 by the addition of 5-normal hydrochloric acid. During the acidification, a 2-(carboxymethoxy)-5-chloro-phenyliminodiacetic acid product precipitated in the reaction mixture as a crystalline solid. This product was separated by filtration and successively recrystallized from boiling water and methyl isobutyl ketone. The recrystallized product melted with decomposition at a temperature of 205°–209° C. A sample of this product was titrated with sodium hydroxide and found to have a neutral equivalent of 105.7 as compared with a theoretical equivalent of 105.9.

A 2-(carboxymethoxy)-5-chloro - phenyliminodiacetic acid monopotassium salt product is prepared by reacting one molecular proportion of 2-(carboxymethoxy)-5-chloro-phenyliminodiacetic acid with one molecular proportion of potassium hydroxide in the manner as described in Example 2.

In a manner similar to the procedures of the foregoing examples the following products are prepared:

A 2-(carboxymethoxy)-5-methyl - phenyliminodiacetic acid product by reacting 2-amino-4-methylphenol with monochloroacetic acid.

A 2-(carboxymethoxy)-4-tertiary-butyl - phenyliminodiacetic acid product by reacting 2-amino-5-tertiary-butyl-phenol with monochloroacetic acid salts.

A 3-bromo - 2 - (carboxymethoxy)phenyliminodiacetic acid product by reacting 2-amino-6-bromophenyl with monochloroacetic acid.

A 2-(carboxymethoxy) - 5 - iodo - phenyliminodiacetic acid product by reacting 2-amino-4-iodophenol with monochloroacetic acid.

A 2 - (carboxymethoxy) - 4,5 - dichlorophenyliminodiacetic acid product by reacting 2-amino-4,5-dichlorophenol with monochloroacetic acid.

A 2-(carboxymethoxy)-4,5-diethyl-phenyliminodiacetic acid product by reacting 2-amino-4,5-diethylphenol with monochloroacetic acid.

A 2-(carboxymethoxy)-5-fluoro - phenyliminodiacetic acid product by reacting 2-amino-4-fluorophenol with monochloroacetic acid.

The compounds of the present invention are useful as herbicides and parasiticides for the control of many bacterial and insect pests. For such use, the compounds may be dispersed on an inert finely divided solid and the resulting preparations employed as dusts. Also such preparations may be dispersed in water with or without the aid of a wetting agent and the resulting aqueous suspensions employed as sprays. In other procedures the compounds may be employed in a solvent such as acetone or as a constituent of solvent-in-water or water-in-solvent emulsions, or as aqueous dispersions which may be employed as a spray, drench, or wash. In a representative operation, aqueous compositions containing 10 parts by weight of 2-(carboxymethoxy)-5-chloro-phenyliminodiacetic acid per million parts of ultimate mixture have been found to give substantially complete kills of the fungus organism, *Rhizoctonia solani*.

We claim:
1. A compound corresponding to the formula

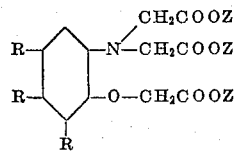

wherein one of the R symbols represents hydrogen and each of the remaining R symbols represents a member of the group consisting of hydrogen, halogen and lower alkyl, and Z represents a member of the group consisting of hydrogen and the alkali metals.

2. 2-(carboxymethoxy)phenyliminodiacetic acid.

3. 2-(carboxymethoxy)-5-chloro - phenyliminodiacetic acid.

4. 2-(carboxymethoxy)phenyliminodiacetic acid, disodium salt.

5. A method of preparing a compound corresponding to the formula

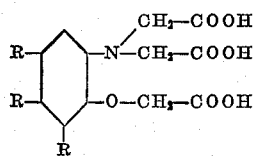

wherein one of the R symbols represents hydrogen and each of the remaining R symbols represents a member of the group consisting of hydrogen, halogen and lower alkyl which comprises the step of reacting at least three molecular proportions of monochloroacetic acid with one molecular proportion of an aminophenol corresponding to the formula

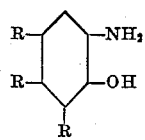

wherein the R symbols are as above defined, said reaction being carried out in the presence of at least 6 molecular proportions of an alkaline reagent and under conditions such that the reaction mixture is maintained at a pH greater than 9.

No references cited.